United States Patent [19]

Lengenfelder

[11] Patent Number: 4,619,343

[45] Date of Patent: Oct. 28, 1986

[54] NOISE-ISOLATED FASTENING OF AN OIL SUMP TO A CRANKCASE

[75] Inventor: Karl Lengenfelder, Nuremberg, Fed. Rep. of Germany

[73] Assignee: M.A.N. Maschinenfabrik Augsburg-Nürnberg Aktiengesellschaft, Nuremberg, Fed. Rep. of Germany

[21] Appl. No.: 758,169

[22] Filed: Jul. 23, 1985

[30] Foreign Application Priority Data

Jul. 26, 1984 [DE] Fed. Rep. of Germany ....... 3427529

[51] Int. Cl.[4] .......................... F02F 7/00; F16F 15/00

[52] U.S. Cl. ................................ 181/208; 123/195 C; 123/198 E

[58] Field of Search ............... 181/204, 207, 208, 205; 123/198 DA, 198 E, 195 C; 24/35

[56] References Cited

U.S. PATENT DOCUMENTS

| | | | |
|---|---|---|---|
| 1,899,795 | 2/1933 | Davis et al. | 24/35 |
| 4,186,714 | 2/1980 | Danckert et al. | 123/195 C |
| 4,202,311 | 5/1980 | Moriyoshi | 123/195 C |
| 4,219,002 | 8/1980 | Danckert et al. | 123/195 C X |
| 4,394,853 | 7/1983 | Lopez-Crevillen et al. | 181/204 X |

*Primary Examiner*—Benjamin R. Fuller
*Attorney, Agent, or Firm*—Becker & Becker, Inc.

[57] ABSTRACT

A simple-to-construct noise-isolated fastening of an oil sump to a crankcase using an intermediate layer of elastic material. In this concept, the oil sump and crankcase are not connected by screws or bolts, but by spring clips which are lined with soft elastic material and which, in the connected condition, elastically engage shaped connecting flanges of the crankcase and oil sump.

9 Claims, 1 Drawing Figure

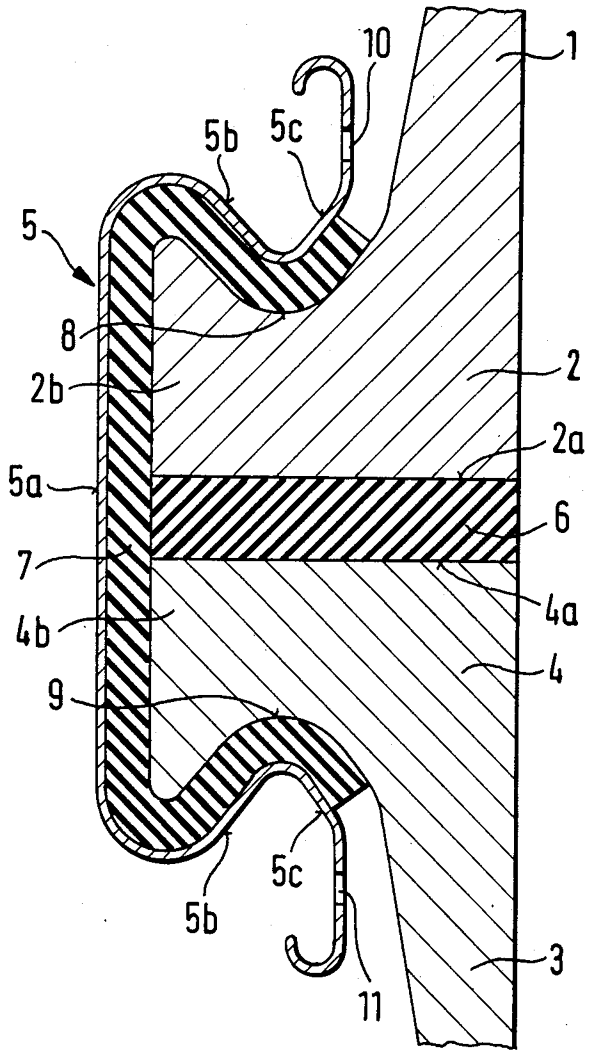
1
10
5b
5c
5
8
2
2b
2a
5a
6
7
4a
4b
4
9
5c
5b
11
3

NOISE-ISOLATED FASTENING OF AN OIL SUMP TO A CRANKCASE

BACKGROUND OF THE INVENTION

1. Field of the Invention

The present invention relates to a noise-isolated fastening of an oil sump or pan to a crankcase of an internal combustion engine using an intermediate layer of elastic material.

2. Description of the Prior Art

It is known to provide a rubber interlayer between the oil sump and the crankcase, and to connect these two parts by means of screws or bolts. In this arrangement, the intermediate rubber layer is greatly compressed, whereby the elasticity of the intermediate rubber layer required to reduce noise radiation is at least partly reduced. Therefore, the desired control of noise radiation is only incomplete in this case. Moreover, the use of screws or bolts (bolted connections) does not preclude the transmission of structure-borne noise from the crankcase to the oil sump.

For this reason, solutions have been disclosed where the fastening means are prevented from directly affecting the elasticity of the rubber material in the region which is critical in preventing the transmission of structure-borne noise (see German Preliminary Patents (Offenlegungsschriften) Nos. 27 23 397, 27 53 717, 30 04 426).

The heretofore known solutions suffer from a number of drawbacks. For instance, German Preliminary Patent No. 27 23 397 provides for an intermediate frame which is connectable to the crankcase and which is attached through the intermediary of a rubber-elastic profiled strip to the oil sump. Both the oil sump and the intermediate frame are formed with a shaped flange, the profiled rubber being bonded to these flanges. The intermediate frame and, consequently, the oil sump, are connected by screws or bolts to the flange of the crankcase. In order to avoid excessive tensile stresses in the profiled strip, the oil sump is provided with special stops.

German Preliminary Patent No. 27 53 717 disclosed a profiled frame made of rubber or plastic. Fastening of this frame is effected by means of screws or bolts applied laterally to the crankcase and the oil sump. To support the screws or bolts (this arrangement calls for double the number of fastening screws or bolts), the crankcase and the oil sump are each provided with a bonded metal ring. Furthermore, in order to increase the stiffness of the crankcase, this concept calls for an additional stiffening flange.

The method of fastening proposed by German Preliminary Patent No. 30 04 426 also provides for a shaped rubber or profiled strip, with the connection of the two parts being effected by means of screws or bolts via a so-called retaining plate.

An object of the present invention is to provide a fastening of the aforementioned general type to isolate structure-borne noise, with the inventive fastening, in contrast to the prior art, being distinguished by a more straightforward and simpler design. Moreover, the invention is intended to maintain noise-isolating and sealing effects without any impairment.

BRIEF DESCRIPTION OF THE DRAWING

These and other objects and advantages of the present invention will appear more clearly from the following specification in conjunction with the accompanying drawing, which shows one specific embodiment of the inventive fastening arrangement.

SUMMARY OF THE INVENTION

The fastening of the present invention is characterized primarily in that the oil sump and the crankcase are held together by a number of specially shaped spring clips which are lined with soft elastic material and which, in the connected state, elastically engage shaped connecting flanges of the two above-mentioned parts of the engine.

This eliminates the need for any screwed or bolted connections. There are no tapped or threaded holes in the engine block, nor are any fastening holes needed in the oil sump; this saves working time and tooling costs. Due to the lesser compression, the elasticity of the elastic intermediate layer (low accoustic impedance or sound-absorbent gasket), which is disposed between the plane surfaces of the crankcase and oil sump flanges, is fully maintained Since the spring clips are also lined with soft elastic material, no transmission of structure-borne noise can take place from the crankcase to the oil sump. Generally, the concept according to the present invention requires fewer structural means.

As a further development of the invention, the edges of the two connecting flanges (of the crankcase and oil sump) are each provided with a groove which extends all the way around, with the outer faces of the edges being vertically in line When the spring steel clips contact the engine block and the oil sump, any lateral displacement is prevented. Naturally, it is also possible, instead of grooves extending all the way around, to provide local grooves (local groove recesses).

The elastic soft material may be in the form of simple, non-profiled sealing strips, the thickness and deformability of which are selected to suit the application. For instance, the sound-absorbing sealing strips between the spring clips and the edges of the flanges may have a thickness of up to half that of the sealing strip between the plane surfaces of the flanges of the crankcase and the oil sump, because the stress-bearing material thicknesses together make up the total thickness again.

According to another development of the invention, the spring clips are substantially formed to match the shape of the joined connecting flanges, and consist of a straight center portion which continues at both ends symmetrically into an inwardly and an outwardly directed end part. The inwardly directed end part needs to have a definite angle. With this inventive type of spring clip, the danger of relative displacement of the parts of the engine under a shear load does not arise.

The outwardly directed end part may be of different shape in its extremity. These different shapes all serve the purpose of enabling the spring clip to be fitted and removed more easily. It is advantageous to have an opening (e.g. a hole or a slot) in the extremities of the spring clip to apply a simple tool.

It is also useful to provide stiffening fins or ribs on the spring clips or clamps in order to obtain additional strength in this manner.

DESCRIPTION OF PREFERRED EMBODIMENTS

Referring now to the drawing in detail, a crankcase 1, which is shown only partly, is formed with a shaped connecting flange 2. The oil sump 3, which is also shown only partially, likewise has a shaped connecting flange 4 The oil sump 3 is connected to the crankcase 1 by means of spring clips 5 (for instance of spring steel), which are bent to shape.

The number of spring clips 5 depends on the load or stress in each particular case. In order to prevent or minimize transmission of vibrations originating from the crankcase 2 to the oil sump 3, and in order to prevent the transmission of structure-borne noise to the oil sump 3, simple non-profiled sealing strips 6 and 7 of soft elastomeric material are placed between the plane surfaces 2*a*, 4*a*of the connecting flanges 2, 4 of the crankcase 1 and the oil sump 3, as well as between the spring clips 5 and the mating or associated flange edges 2*b*, 4*b*. The desired degree of isolation by the sealing strips is achieved through the thickness of the material, the density of the material, and its deformability.

The spring clips 5, which are formed to match the combined shape of the flanges 2 and 4, consist of a straight center portion 5*a*which continues at each end symmetrically, via rounded sections, into an inwardly directed end portion 5*b*and an outwardly directed end portion 5*c*. In order for spring clips of this shape to be able to hold the parts 1 and 3 of the engine together, the edges 2*b*, 4*b*of the two connecting flanges 2, 4 are each provided either with a groove extending all the way around (8 and 9), or with local grooves, i.e. local groove recesses (8,9), the number of which correspond to the number of clips and for which the drawing illustration in section also relates to such local grooves.

The outwardly directed end portions 5*c*of the spring clips 5 are formed in their extremities to permit a fitting or removal tool to be applied. For this purpose, a respective opening 10 or 11 (hole or slot) is provided in each end of the clips 5; a screwdriver bit may be inserted in one of these openings, for instance to lift out the clip.

In addition, the clips 5 may be provided with stiffening fins or ribs (not shown), in particular at the transition from the center portion 5*a*to the inwardly directed end portion 5*b*, in order to obtain additional strength, in other words, a better clamping effect, i.e. an increased spring load.

Finally, it should be mentioned that the fastening arrangement according to the present invention may also be applied to the fastening of the valve covers to the cylinder heads in order to obtain noise isolation at this location as well.

Moreover, it should be mentioned that, apart from the advantages of noise isolation, the inventive positive connection (snap-fit fastening) is also distinguished by the ease with which it can be disconnected, though not unintentionally. It should also be pointed out that the spring clips can be re-used whereas in the case of screws or bolts, the latter are frequently destroyed when an attempt is made to loosen them, or they cannot be re-used because of corrosion.

The present invention is, of course, in no way restricted to the specific disclosure of the specification and drawing, but also encompasses any modifications within the scope of the appended claims.

What I claim is:

1. A noise-isolated fastening of an oil sump to a crankcase of an internal combustion engine using an intermediate layer of elastic material; said fastening comprises:

a plurality of specially shaped spring clips which hold said oil sump and crankcase together directly with each other said crankcase being provided with a first shaped connecting flange, and said oil sump being provided with a second shaped connecting flange; in a connected state, said spring clips elastically engage said first and second connecting flanges directly to effect said holding together of said oil sump and said crankcase; soft elastic material is disposed between said spring clips on the one hand, and said first and second connecting flanges on the other hand completely free of any screw fastening otherwise being provided therewith.

2. A fastening according to claim 1, in which the outer surface of each of said first and second connecting flanges is provided with a groove which extends all the way around; and in which the outermost faces of said connecting flanges are in line with one another.

3. A fastening according to claim 1, in which the outer surface of each of said first and second connecting flanges is provided with local recesses, and in which the outermost faces of said connecting flanges are in line with one another.

4. A fastening according to claim 1, in which said first and second connecting flanges of said crankcase and said oil sump are each provided with plane surfaces which face one another, and with outer surfaces which face said spring clips; and which includes simple, non-profiled sealing strips of elastic material which are disposed between said spring clips and said outer surfaces of said connecting flanges, and between said plane surfaces of said connecting flanges.

5. A fastening according to claim 4, in which said sealing strips have an appropriate thickness and deformability.

6. A fastening according to claim 1, in which each of said spring clips comprises a straight center portion having two ends, each of which continues symmetrically first into an inwardly directed end portion, and then into an outwardly directed end portion.

7. A fastening according to claim 6, in which at least one of said outwardly directed end portions of each of said spring clips is formed in such a way that a tool can be applied thereto.

8. A noise-isolated fastening of an oil sump to a crankcase of an internal combustion engine using an intermediate layer of elastic material; said fastening comprising:

a plurality of specially shaped spring clips which hold said oil sump and crankcase together; said crankcase being provided with a first shaped connecting flange, and said oil sump being provided with a second shaped connecting flange; in a connected state, said spring clips elastically engaging said first and second connecting flanges to effect said holding together of said oil sump and said crankcase; soft elastic material being disposed between said spring clips on the one hand, and said first and second connecting flanges on the other hand; each of said spring clips comprising a straight center portion having two ends, each of which continues symmetrically first into an inward directed end portion, and then into an outwardly directed end portion; at least one of said outwardly directly end portions of each of said spring clips being formed in such a way that a tool can be applied thereto; said at least one outwardly directed end portion of a given spring clip being provided with at least one opening to receive said tool.

9. A noise-isolated fastening of an oil sump to a crankcase of an internal combustion engine using an intermediate layer of elastic material; said fastening comprises:

a plurality of specially shaped spring clips which hold said oil sump and crankcase together, with each of said spring clips being provided with end portions; said crankcase is provided with a first shaped connecting flange, and said oil sump is provided with a second shaped connecting flange, with the outer surfaces of each of said connecting flanges being provided with groove means for receiving said end portions of said spring clips in such a way that in a connected state, said spring clips elastically engage said first and second connecting flanges to effect said holding together of said oil sump and said crankcase; soft elastic material is disposed between said spring clips on the one hand, and said first and second connecting flanges on the other hand.

* * * * *